United States Patent Office 3,308,127
Patented Mar. 7, 1967

3,308,127
PROCESS FOR THE PRODUCTION OF NAPH-
THALIC ACID DERIVATIVES
Hisashi Senshu, Kitakyushu-shi, Japan, assignor to Mitsu-
bishi Chemical Industries Limited, Tokyo, Japan, a cor-
poration of Japan
No Drawing. Filed Aug. 24, 1964, Ser. No. 391,776
12 Claims. (Cl. 260—281)

The invention relates to a process for th eproduction of naphthalic acid derivatives. More particularly, the invention relates to an improved process for the production of 4-halogeno-naphthalic acid or anhydride thereof, or 4-halogeno-naphthalimide or N-derivatives thereof. These naphthalic acid derivatives are useful intermediates for use in producing invaluable dyestuffs or optical whitening agents as will be illustrated.

It has been known that acenaphthene is caused to react in an organic solvent such as chloroform or diethyl ether with a halogenating agent such as sulfuryl chloride or bromine to produce a mixture of 5-halogeno-acenaphthene and 4-halogeno-acenaphthene, and the 5-halo-acenaphthene is then isolated from said mixture to be subjected to oxidation resulting in the production of 4-halogeno-naphthalic anhydride. Also it has been known that the 4-halogeno-naphthalic anhydride thus obtained is caused to react with ammonia or organic amines to produce 4-halogeno-naphthalimide or N-derivatives thereof.

Because of difficulties encountered in the halogenation of said acenaphthene, however, it has been impossible to obtain a halogenated product with a sufficiently high yield in spite of many hours required for effecting the reaction. Further, 4-halogeno-acenaphthene, i.e., an isomer which is inevitably contained as a by-product in said halogenated product comprising 5-halogeno-acenaphthene ought to have been separated. Still further, said halogenation has been bound to the employment of an organic solvent of low boiling point such as chloroform or diethyl ether which is liable to catch fire, involving risk in the operation.

An object of the invention is to provide an economical process for the production of 4-halogeno-naphthalic acid or anhydride thereof, or 4-halogeno-napthalimide or N-derivatives thereof which is free from such defects in the prior art as mentioned above.

The said object is accomplished according to the invention by heating in an aqueous solution 4-sulpho-naphthalic acid or anhydride thereof, or 4-sulpho-naphthalimide or N-derivative thereof, or an alkali metal salt of any of them together with a hydrohalic acid and an alkali metal halogenate.

The starting compounds to be employed in the method of the invention include 4-sulpho-naphthalic acid or anhydride thereof, and alkali metal salt thereof such as sodium salt or potassium salt which may be indicated by the formulae which follows:

or

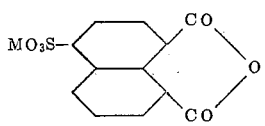

wherein M denotes hydrogen atom or alkali metal.

The abovementioned 4-sulpho-naphthalic acid or anhydride thereof is economically produced by following, as for example, the known method in which acenaphthene is subjected to sulphonation and subsequent oxidation.

The starting compounds to be employed according to the invention include 4-sulpho-naphthalimides and alkali metal salt thereof such as sodium salt or potassium salt which may be indicated by the formula which follows:

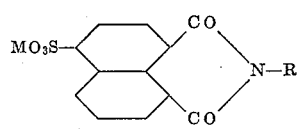

wherein M denotes hydrogen atom or alkali metal and R hydrogen atom; or alkyl-, aryl-, or cycloalkyl-group which may have a substituent.

The R in the above formula includes hydrogen atom; alkyl group such as methyl-, ethyl-, n-propyl, i-propyl-, n-butyl-, i-butyl-, n-octyl-, or 2-ethyl-hexyl-group; substituted alkyl group such as hydroxy-ethyl-, hydroxy-propyl-, hydroxy-butyl, methoxy-ethyl-, N,N- dimethyl-amino-ethyl-, N,N - diethylamino-ethyl-, N,N - dimethyl-amino - propyl-, N,N - diethylamino-propyl-, or benzyl-group; aryl group such as phenyl-group; substituted aryl-group such as tolyl- or chloro-phenyl-group; and cycloalkyl-group such as cyclohexyl-group. These 4-sulpho-naphthalimides are easily produced by causing 4-sulpho-naphthalic acid or anhydride thereof, or an alkali metal salt of any of them to react with ammonia or the corresponding organic amines.

According to the present invention the sulpho group combined with a carbon atom at the 4-position of the above-mentioned starting compound is substituted by a halogen atom by the treatment of the starting compound in an aqueous solution with a hydrohalic acid and an alkali metal halogenate.

The hydrohalic acids to be employed according to the invention include hydrochloric acid and hydrobromic acid. The alkali metal halogenates to be employed together with the hydrohalic acid according to the invention include sodium chlorate, potassium chlorate, sodium bromate and potassium bromate. In carrying out chlorination, hydrochloric acid is employed with sodium chlorate or potassium chlorate, and in carrying out bromination, hydrobromic acid is employed with sodium bromate or potassium bromate.

The method according to the invention is carried out by dissolving the aforesaid starting compound in water, and a hydrohalic acid and an alkali metal halogenate in excess of the theoretical amount, respectively, are added to the aqueous solution, which is then heated up to a temperature above 50° C., preferably to a temperature from 85° to 100° C. under the atmospheric pressure. Upon completion of reaction, the reaction mixture is cooled and the reaction product is filtrated to take out the precipitate, which is dried to obtain the aimed product with a yield more than 90% of the theory. This product may be purified, if so desired, by recrystallization.

The 4-halogeno-naphthalic anhydride or 4-halogeno-naphthalimides produced in accordance with the invention have been found very useful as the intermediate for use in the production of some kinds of invaluable dyestuff or optical whitening agent.

For example, invaluable naphthoylene-benzoimidazol disperse dyestuff as will be indicated by the formula shown below may be economically produced by condensing 4-chloro- or 4-bromo-naphthalic anhydride with an aromatic diamine such as 3,4-diamino anisol in water or an organic solvent and subsequently causing the condensation product thus obtained to react with an alcohol such as methanol in the presence of an acid-binding agent such as sodium hydroxide. The said dyestuff gives dyeings on fibrous materials made from polyester such as polyethylene terephthalate in brilliant yellow shades of excellent fastness to sublimation, light and washing.

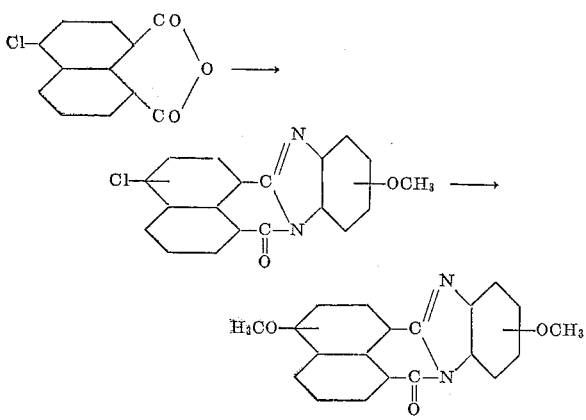

Further, N-alkyl-4-alkylthio-naphthalimide such as N-methyl-4-methylthio-naphthalimide indicated by the following formula which is invaluable optical whitening agent to be used for artificial or synthetic organic high molecular weight materials may be economically produced by causing a N-alkyl-4-halogeno-naphthalimide such as N-methyl-4-chloro-naphthalimide to react with sodium sulphide in water to yield N-alkyl-4-mercaptonaphthalimide, which is then caused to react with an alkylating agent such as dimethyl sulphate in water.

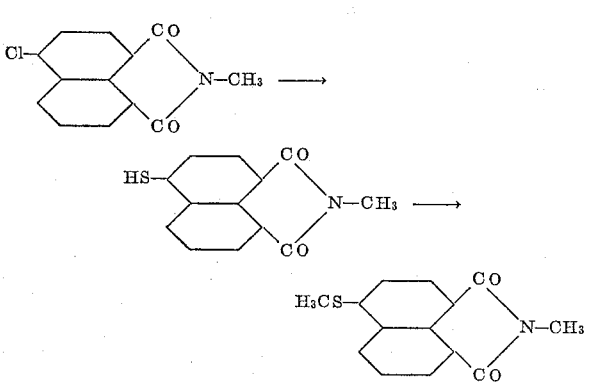

Some preferred embodiments of the invention will be described in detail wherein the examples given are for the purpose of illustrating preferred embodiments only and not for the purpose of limiting the same. The "part" in the following denotes the portion by weight unless otherwise specified. The melting point of the compound shown in the following examples is of uncorrection value.

Example 1

30.0 parts of sodium salt of 4-sulpho-naphthalic acid, which is indicated by the formula:

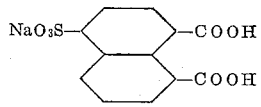

were dissolved in 300 parts of water, followed by the addition of 125.1 parts of 35% hydrochloric acid thereto and heating under stirring at 90° C. A solution consisting of 30 parts of water and 10.7 parts of sodium chlorate ($NaClO_3$) was further added thereto in drops requiring 1 hour and stirred for 2 hours at the same temperature. Upon completion of reaction, the resultant was cooled and filtrated to take out precipitate, which was washed and dried to obtain 19.6 parts of 4-chloro-naphthalic anhydride of the melting point from 215° to 216° C. In place of sodium salt of 4-sulpho-naphthalic acid employed in this example equi-mol of 4-sulpho-naphthalic acid or potassium salt of 4-sulpho-naphthalic acid, or an anhydride of any of them may be employed to bring out the similar results. Further, in place of sodium chlorate employed in this example equi-mol of potassium chlorate may be employed to accomplish the similar end.

Example 2

100 parts of sodium salt of 4-sulpho-naphthalic acid were dissolved in 1000 parts of water, followed by addition of 640 parts of 48% hydrobromic acid thereto, heating under stirring at 90° C., addition of the solution consisting of 1000 parts of water and 160 parts of potassium bromate ($KBrO_3$) thereto in drops requiring 2 hours and stirring for 5 hours at 95° C. Upon completion of reaction, the resultant was cooled and filtrated to take out precipitate, which was washed and dried to obtain 82.0 parts of 4-bromo-naphthalic anhydride of melting point from 212° to 216° C. 4-sulpho-naphthalic acid or potassium salt of 4-sulpho-naphthalic acid or an anhydride of any of them may be employed as the starting compound in this example in order to attain the similar results. Further, potassium bromate employed in this example may be replaced by equi-mol of sodium bromate to attain the similar results.

Example 3

100 parts of sodium salt of N-methyl-4-sulpho-naphthalimide as indicated by the formula:

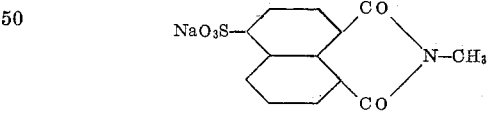

were dissolved in 1000 parts of water, 400 parts of 35% hydrochloric acid were added thereto and heated under stirring at 90° C. A solution consisting of 100 parts of water and 34 parts of sodium chlorate was added in drops thereto requiring 2 hours and stirred for 2 hours at a temperature from 95 to 100° C. Upon completion of reaction, the resultant was cooled and filtrated to take out precipitate, which was washed and dried to obtain 72 parts of N-methyl-4-chloro-naphthalimide of a melting point from 163.8 to 165.5° C.

In place of sodium salt of N-methyl-4-sulpho-naphthalimide employed in this example equi-mol of N-methyl-4-sulpho-naphthalimide or potassium salt of N-methyl-4-sulpho-naphthalimide may be employed to attain the similar results.

Examples 4 to 11

The compounds as indicated in the following table, column I were employed in carrying out the methods of the aforementioned Examples 1, 2 or 3 to produce the compounds as indicated in column II.

| | (I) Starting compound | (II) Resulting product | M.P., °C. | Operation |
|---|---|---|---|---|
| Ex. 4 | Sodium salt of N-methyl-4-sulphonaphthalimide | N-methyl-4-bromonaphthalimide | 185–186 | Method of Ex. 2. |
| Ex. 5 | Sodium salt of N-n-butyl-4-sulphonaphthalimide | N-n-butyl-4-chloronaphthalimide | 190.5–191.5 | Method of Ex. 3. |
| Ex. 6 | Sodium salt of N-(2'-hydroxy)ethyl-4-sulphonaphthalimide | N-(2'-hydroxy)ethyl-4-chloronaphthalimide | 194.5–195.2 | Do. |
| Ex. 7 | Sodium salt of N-(N', N'-dimethylamino) propyl-4-sulphonaphthalimide | N-(N', N'-dimethylamino)propyl-4-chloronaphthalimide | 102.0–104.5 | Do. |
| Ex. 8 | Sodium salt of N-(2-ethyl)hexyl-4-sulphonaphthalimide | N-(2-ethyl)hexyl-4-chloronaphthalimide | 134.0–136.5 | Method of Ex. 1. |
| Ex. 9 | Sodium salt of N-phenyl-4-sulphonaphthalimide | N-phenyl-4-chloronaphthalimide | 239–240 | Do. |
| Ex. 10 | Sodium salt of N-p-tolyl-4-sulphonaphthalimide | N-p-tolyl-4-chloronaphthalimide | 143–156.5 | Do. |
| Ex. 11 | Sodium salt of N-benzyl-4-sulphonaphthalimide | N-benzyl-4-chloronaphthalimide | 168.5–170.7 | Do. |

What I claim is:

1. A process for the production of 4-halogeno-naphthalic acid or anhydride thereof, or 4-halogeno-naphthalimide or N-derivative thereof which comprises heating in an aqueous solution 4-sulpho-naphthalic acid or anhydride thereof, or 4-sulpho-naphthalimide or an N-derivative thereof, or an alkali metal salt of any of them in an aqueous solution with a hydrohalic acid selected from a group consisting of hydrochloric acid and hydrobromic acid and an alkali metal halogenate selected from a group consisting of sodium chlorate, potassium chlorate, sodium bromate, and potassium bromate.

2. A process for the production of 4-halogeno-naphthalic acid as indicated by the formula or anhydride thereof:

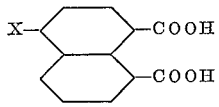

wherein X denotes a halogen atom which comprises heating in an aqueous solution 4-sulpho-naphthalic acid as indicated by the formula or anhydride thereof:

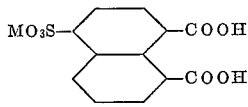

wherein M denotes hydrogen atom or an alkali metal with a hydrohalic acid selected from a group consisting of hydrochloric acid and hydrobromic acid and an alkali metal halogenate selected from a group consisting of sodium chlorate, potassium chlorate, sodium bromate, and potassium bromate.

3. A process for the production of 4-halogeno-naphthalimide as indicated by the formula or an N-derivative thereof:

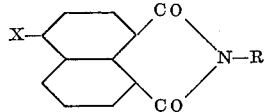

wherein X denotes a halogen atom and R hydrogen atom; or alkyl-, aryl-, or cycloalkyl-group which may have a substituent which comprises heating in an aqueous solution 4-sulpho-naphthalimide as indicated by the formula or an N-derivative thereof:

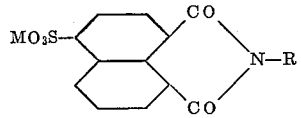

wherein M denotes hydrogen atom or an alkali metal with a hydrohalic acid selected from a group consisting of hydrochloric acid and hydrobromic acid and an alkali metal halogenate selected from a group consisting of sodium chlorate, potassium chlorate, sodium bromate, and potassium bromate.

4. A process as claimed in claim 1 which is characterised in employing hydrochloric acid as the hydrohalic acid, and sodium chlorate or potassium chlorate as the alkali metal halogenate.

5. A process as claimed in claim 1 which is characterised in employing hydrobromic acid as the hydrohalic acid, and sodium bromate or potassium bromate as the alkali metal halogenate.

6. A process as claimed in claim 1 which is characterised in carrying out the process under the atmospheric pressure at a temperature from 85 to 100° C.

7. A process as claimed in claim 2 which is characterized in employing hydrochloric acid as the hydrohalic acid, and sodium chlorate or potassium chlorate as the alkali metal halogenate.

8. A process as claimed in claim 3 which is characterized in employing hydrochloric acid as the hydrohalic acid, and sodium chlorate or potassium chlorate as the alkali metal halogenate.

9. A process as claimed in claim 2 which is characterized in employing hydrobromic acid as the hydrohalic acid, and sodium bromate or potassium bromate as the alkali metal halogenate.

10. A process as claimed in claim 3 which is characterized in employing hydrobromic acid as the hydrohalic acid, and sodium bromate or potassium bromate as the alkali metal halogenate.

11. A process as claimed in claim 2 which is characterized in carrying out the process under the atmospheric pressure at a temperature from 85 to 100° C.

12. A process as claimed in claim 3 which is characterized in carrying out the process under the atmospheric pressure at a temperature from 85 to 100°.

References Cited by the Examiner

Cannell J. Am. Chem. Soc., vol. 79, pp. 2932–5, 2941 relied on (1957).

Dashevskii, abstracted in Chem. Abstracts, vol. 55, columns 23490 N to 23491 (1960).

ALEX MAZEL, *Primary Examiner.*

HENRY R. JILES, *Examiner.*

D. G. DAUS, *Assistant Examiner.*